June 17, 1952          N. MADSEN          2,600,892
LAWN MOWER HAVING OPPOSITE HANDED HELICAL CUTTING BLADES
Original Filed Oct. 27, 1947          2 SHEETS—SHEET 1
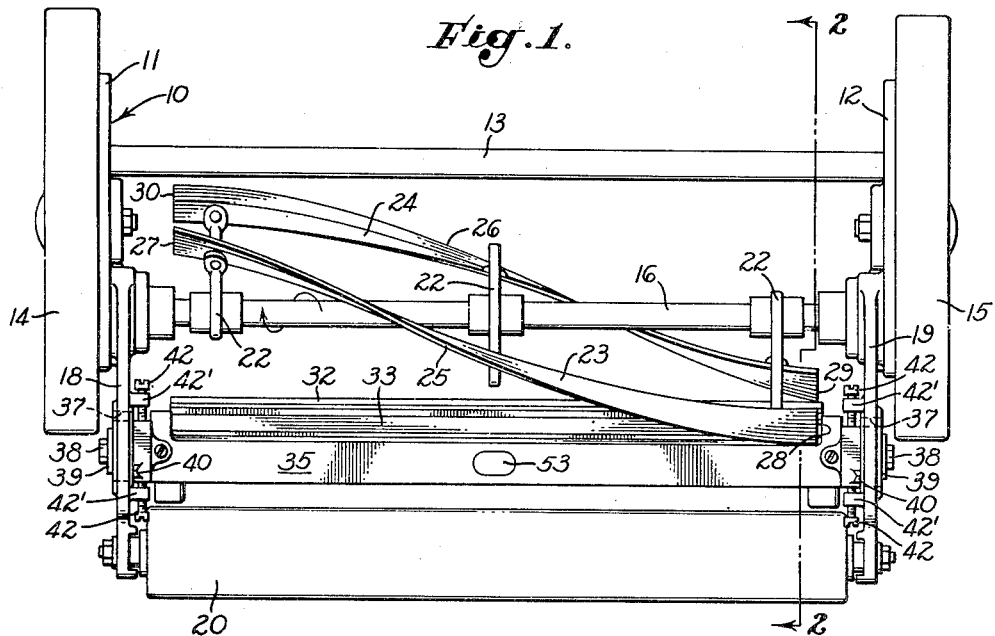
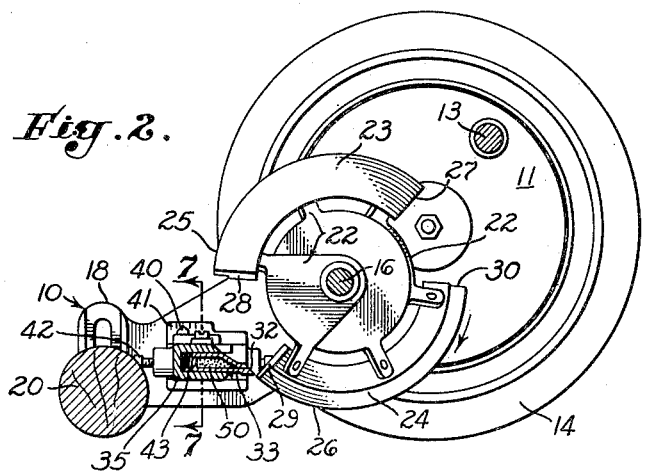
INVENTOR.
NILS MADSEN
BY HIS ATTORNEYS.
HARRIS, KIECH, FOSTER & HARRIS June 17, 1952           N. MADSEN           2,600,892
LAWN MOWER HAVING OPPOSITE HANDED HELICAL CUTTING BLADES
Original Filed Oct. 27, 1947           2 SHEETS—SHEET 2
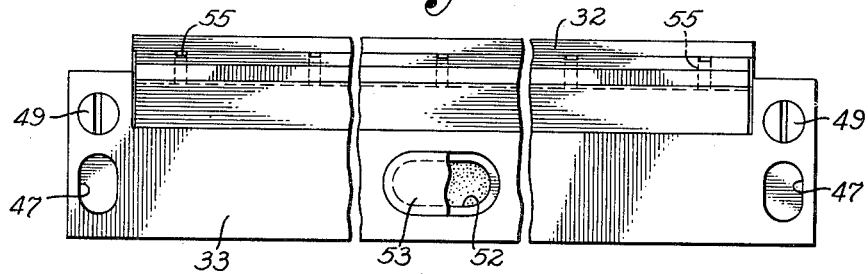
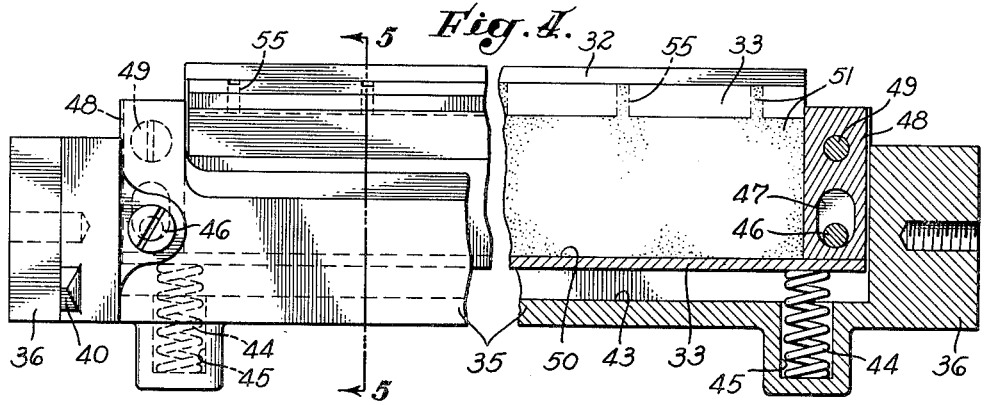
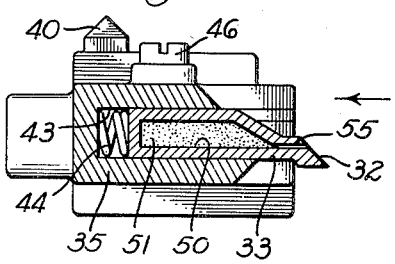
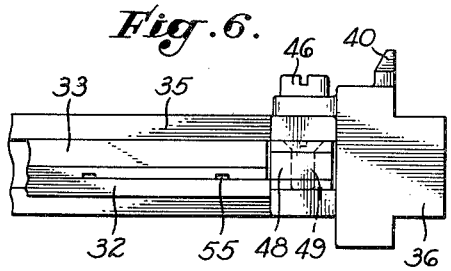
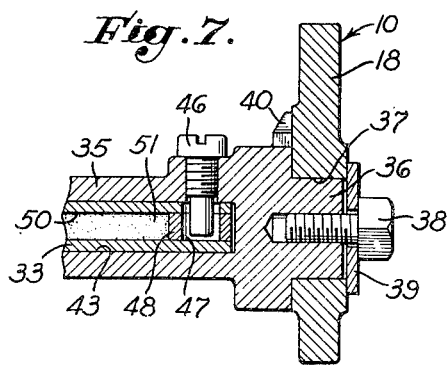
INVENTOR.
NILS MADSEN
BY HIS ATTORNEYS.
HARRIS, KIECH, FOSTER & HARRIS

UNITED STATES PATENT OFFICE

2,600,892

LAWN MOWER HAVING OPPOSITE HANDED HELICAL CUTTING BLADES

Nils Madsen, San Pedro, Calif.; Liv Madsen, administratrix of said Nils Madsen, deceased, assignor to Liv Madsen, San Pedro, Calif.

Original application October 27, 1947, Serial No. 782,356. Divided and this application September 26, 1949, Serial No. 117,836

2 Claims. (Cl. 56—294)

My invention relates to mowing machines for cutting grass and like vegetation and particularly to a mower of the rotary type. The present application is a division of my application for patent on Lawn Mower, Serial No. 782,356, filed October 27, 1947 now abandoned.

Lawn mowers of the rotary type are usually provided with a rotatable blade or blades which are turned by the traction wheels of the mower as the latter is propelled along the surface of the ground, these rotating blades being commonly helical and movable across a stationary cutter bar to coact in effecting a shearing action for cutting the grass which enters the cutting area between the rotary blades and the stationary cutter bar. The cutter bar is usually adjustable toward and away from the circular path of movement of the rotary blades so that the cooperation between the movable blades and the immovable cutter bar necessary to produce the proper shearing action and clean cutting of the grass is attained. It is a well-known fact that both the rotary blades and the cutter bar frequently become dull and the cutting action is impaired. The dulling of the cutting edges of these elements is due to the presence of sand or grit on the grass itself or foreign objects, such as stones, twigs, leaves, etc., in the lawn and it is thus necessary to frequently renew or sharpen the cutting edges in order to maintain efficient operation of the mower.

It is generally conceded that even though the cutting elements are made from high grade steel the wearing away and dulling of their cutting edges can neither be eliminated nor reduced to any appreciable extent. Various means have been devised for sharpening rotary blades without removing the same from the mower, such means being adapted to engage the cutting edges of the rotary blades, upon rotation of the blades when the mower is not in use, so as to grind, file or otherwise renew the cutting edges. It is therefore necessary to stop the mowing operation to perform the sharpening operation and for this reason the sharpening of the blades is frequently delayed, with the result that the lawn cannot be properly mowed. Moreover, it is imperative that the rotary blades and the cutter bar be simultaneously sharpened so as to insure proper contact therebetween throughout their entire length and for this reason it has been necessary to remove the cutter bar from the mower and sharpen it in a separate grinding operation. Attempts have also been made to simultaneously sharpen the cutting edges of both the rotary blades and fixed cutter bar with the use of an abrasive material applied to the blades but such an expedient has proved inefficient for the reason that the presence of grass clippings interferes with the proper application of the abrasive to the blades and it is therefore necessary to perform the sharpening operation, when the mower is not in use, by rotating the traction wheels when the latter are raised off the ground.

It is therefore an object of my invention to provide a lawn mower which embodies means for automatically and continuously sharpening both the rotary blades and the cutter bar during the operation of mowing the lawn. The sharpening operation is preferably effected by the introduction of abrasive particles between the cutting edges of the rotary blades and the cutter bar so that the cutting edges are ground away uniformly to insure proper cooperation therebetween. As the cutting edges are ground down by the abrasive action, the cutter bar is periodically adjusted closer to the rotary blades so as to maintain the proper shearing action. The present lawn mower embodies means for effecting quick and accurate adjustment of the cutter bar for the purpose stated above, and this is another object of my invention.

Another object is to provide a mower in which the cutter bar has a cavity or receptacle for containing a supply of loose abrasive particles, and one or more passages extending from the receptacle to the cutting edge of the bar and through which the particles can pass to the inter-engaging cutting edges of the blades and bar. By this means the abrasive material is protected against contamination by dirt, grass clippings and other foreign matter and thus the flow of the material to the cutting edges is unimpaired and can be effected during the normal grass cutting operation. Moreover, the size of the passages determines the rate of flow of the abrasive material so that a proper feeding of the abrasive for grinding purposes is assured and an over-supply thereof is avoided.

Another object of the invention is to provide a mower of the type indicated in which the cutter bar is mounted in such a manner that it can vibrate or reciprocate to a slight extent toward and away from the rotary blades for the purpose of shaking the abrasive particles to cause them to feed through the passages. Preferably, the cutter bar is moved in one direction through the engagement of the cutting edges of the rotary blades with the cutting edge of the cutter bar as the blades move across the bar, and in the opposite direction by spring means engageable with the bar. Thus, vibratory movement is imparted to the cutter bar only during the rotation of the cutter blades so that the feeding of the abrasive particles to the cutting edges is effected only during operation of the mower. This constitutes an improvement over sharpening devices of prior types wherein a liquid containing the abrasive particles flows continuously to the cutting edges and over devices having an open reservoir for the particles disposed in close proximity to the rotary blades and from which the particles can be spilled or otherwise displaced.

Lawn mowers of conventional types usually have a plurality of helical cutter blades which revolve about a common axis, and helices of the blades being of the same hand, that is, extending in the same direction. Since all the blades revolve in the same direction their leading ends contact the fixed cutter bar at the same end thereof. For example, if the blades initially contact the cutter bar at its right-hand end and progressively engage other portions of the bar toward its left-hand end, then the shearing action is also toward the left. Due to the fact that all the shearing is done in the same direction by the several blades, there is a noticeable tendency of the mower to move in the direction of least resistance or, in other words, in a path opposite to the direction of the progressive shearing action across the cutter bar. When such an arrangement of helical blades is used, any point on the cutting edges of the blades moves across the cutting edge of the bar at an angle less than 90 degrees to the horizontal and thus the presence of foreign matter between the contacting edges causes diagonal scoring and wearing away of these edges, always in the same direction. Moreover, the end of the cutting edge of the cutter bar with which the blades initially contact wears away at a faster rate than the opposite end so that uneven wear is caused and the grass is clipped more efficiently at one side of the mower than at the other side thereof. This, of course, necessitates careful and repeated adjustment of the cutter bar.

It is another important object of my invention to obviate such conditions by providing a lawn mower in which the edges of the rotary blades and cutter bar will wear more evenly throughout their lengths and a mower which will have no tendency to deviate from the path through which it is being propelled. This object is best attained by providing a mower in which the successive helical blades are of opposite hand or, in other words, have their helices extending in opposite directions. By this provision, the leading ends of the helices of successive blades enter the cutting zone at opposite ends of the cutter bar and thus the wearing down of the cutting edges is made substantially uniform from end to end of the blades and bar. The resistance to forward motion of the lawn mower is therefore equalized at the sides of the mower so that the grass is cut more evenly and fatigue, on the part of the person operating the mower, is minimized.

Another object is to provide a lawn mower in which each of the rotary helical blades of opposite pitch is of sufficient length to extend throughout the full length of the stationary cutter bar. By this provision, the grass cuttings are carried by successive blades alternately toward opposite ends of the cutter bar and this is a desirable feature since the resistance offered by the grass clippings to forward motion of the mower is equalized and any tendency of the mower to deviate from the path through which it is being propelled is avoided. This constitutes an important improvement over a previously proposed lawn mower in which rotary blades of opposite hand and of a length equal to half the length of the cutter bar are employed, it being apparent that in the prior lawn mower all the grass clippings are moved toward the center of the cutter bar and thus tend to bunch or gather at this location to impede the forward movement of the mower, especially when a grass catcher is employed. In the present lawn mower, the grass clippings are thrown into piles adjacent the sides of the grass catcher and these piles eventually topple toward the central area of the catcher, Moreover, in the prior lawn mower having separate coaxial groups of rotary blades, it is necessary that the inner ends of the blades at least meet at the center of the mower so as to produce an uninterrupted shearing action across the mower. To allow for future sharpening of the blades and to compensate for manufacturing inaccuracies, it has been necessary to overlap the inner ends of the blades with the result that at the mid portion of the cutter bar a double mowing of the grass is effected and narrow strips of more closely mowed grass appear in the lawn. This undesirable condition is avoided by the use of the present improved lawn mower in which no such overlapping of blades is necessary, or possible.

Further objects of my invention will be apparent from the following detailed description, and from the drawings, in which:

Fig. 1 is a plan view of a lawn mower embodying the features of my invention;

Fig. 2 is a cross-sectional view through the mower, taken on line 2—2 of Fig. 1;

Fig. 3 is a plan view of the improved cutter bar employed in the improved mower;

Fig. 4 is a plan view, shown partly in section, of the holder and cutter bar assembly;

Fig. 5 is a cross-sectional view, taken on line 5—5 of Fig. 4;

Fig. 6 is a side elevation of a portion of the assembly, as viewed in the direction of the arrow in Fig. 5; and Fig. 7 is a sectional view, taken on line 7—7 of Fig. 2.

Referring to the drawings in detail, my improved lawn mower is more or less conventional in general form, the mower illustrated in Figs. 1 and 2 being of the rotary, manually-operated type. It will be apparent from the following that the present improvements may be embodied equally as well in mowers of the power-operated type. The present improved lawn mower is constructed in a manner which will enable it to carry out the sharpening method disclosed in my prior United States Patent No. 2,425,106 dated August 5, 1947, and titled "Method of Sharpening Lawn Mowers."

The lawn mower consists of a frame 10 which includes a pair of spaced, circular gear housings 11 and 12 connected by a tie-rod 13. Rotatable on the housings 11 and 12 are traction wheels 14 and 15 which support the frame 10 and roll along the ground as the mower is propelled by means of the usual handle pivotally connected to the sides of the frame but not herein shown. The housings 11 and 12 have bearings in which a horizontal shaft 16 is rotatable, and the usual trains of gearing and one-way clutch devices (not shown) are provided between the traction wheels 14 and 15 and the shaft 16 so that the latter is rotated in response to forward movement of the mower along the ground. Secured to the inner sides of the housings 11 and 12 are rearwardly projecting side members or arms 18 and 19 between the outer ends of which a transverse supporting roller 20 is rotatably held.

Secured to spaced arms 22, projecting radially from the shaft 16, are helical cutter blades 23 and 24 having their respective cutting edges 25 and 26 arranged concentric with the axis of the shaft. The blades 23 and 24 are thus rotated with the shaft 16 in clockwise direction, as viewed in Fig. 2. It will be observed by reference to Fig. 1 that the helices of the blades 23 and 24 are of opposite hand. That is to say, the left-hand end 27 of the spiral blade 23 is advanced, in the direction of rotation of the shaft 16, over the right-hand end 28 thereof and for this reason the blade 23 is one of right-hand helix. The blade 24, on the other hand, has its leading end 29 located at the right-hand side of the mower and its trailing end 30 disposed at the left-hand side thereof so that this blade is of left-hand helix. By this arrangement of the blades, the leading end 27 of the blade 23 contacts the left-hand end of the cutting edge 32 of a transverse cutter bar 33, to be later described in detail, while the leading end 29 of the blade 24 contacts the right-hand end of the cutting edge 32 when the mower is propelled forwardly. It is thus apparent that the blades 23 and 24 coact with the relatively fixed cutter bar 33 to produce shearing actions alternately in opposite directions so that wearing away of the cutting edges of the blades and bar is more evenly distributed throughout the lengths of the cutting edges and, because the resistance offered by the grass to the forward movement of the mower is equal at both sides of the mower, the mower can be more readily guided along a straight path.

The present drawings illustrate the lawn mower as having a pair of the rotary cutter blades by way of example but it will be understood that a greater number of the blades may be employed. In such case, the helices of alternate blades would extend in the same direction so that the cutter bar 33 would be contacted alternately at its opposite ends and the shearing actions would be first in one direction and then in the opposite direction.

It is to be noted that the rotary blades 23 and 24 are each substantially equal in length to that of the cutter bar so that the grass clippings are moved by the blades toward the sides of the mower, that is, toward the ends of the cutter bar. Due to this fact, any tendency of the clippings to gather at the center of the mower is avoided and resistance to forward motion of the lawn mower is eliminated. Thus the present mower can be propelled with less effort, even when tall and tough grass is being cut, and fatigue on the part of the operator is minimized. Moreover, since the mower advances in a straight path without skipping, the grass is cut more uniformly and a single mowing is sufficient to obtain the desired result.

An elongated holder 35, in the form of a rectangular bar, is provided with reduced ends 36 which are slidable in elongated openings 37 in the arms 18 and 19 of the mower frame 10 (Fig. 7). Thus, the holder 35 is adapted to be adjusted toward and away from the shaft 16, the holder being retained in adjusted position by bolts 38 and washers 39. The holder 35 preferably is provided with pointers 40 at its ends which are adapted to register with markings 41 of scales marked on the inner surfaces of the arms 18 and 19 to facilitate such adjustment. Set screws 42 are adjustable in lugs 42', formed integral with arms 18 and 19 and engage the opposite sides of the holder 35 to retain the holder in its positions of adjustment.

The holder 35 is provided with a slot 43 cut into its inner side for receiving the cutter bar 33 which is adapted to slide transversely therein. The cutter bar 33 is normally slid forwardly toward the rotary blades 23 and 24 by means of compression springs 44 held in pockets 45 in the holder 35 and engaging against the rearward side of the cutter bar. The cutter bar is thus urged in a direction to dispose its slightly concave cutting edge 32 in close proximity to the cutting edges of the blades as they revolve in a circular path thereacross. Sliding movement of the cutter bar 33 on the holder 35 is limited by the engagement of stop screws 46 on the holder with the ends of openings 47 in the bar (Figs. 4 and 7). Preferably, the ends of the cutter bar 33 are closed by rectangular blocks 48 in which the slots 47 are formed, the blocks being secured in place by screws 49. The purpose of the screws 46 and slots 47 is to permit the cutter bar 33 to move rearwardly, with respect to the holder 35, against the action of the springs 44. Such rearward sliding movement of the cutter bar 33 is brought about by the light engagement of the cutting edges of the blades 23 and 24 with the cutting edge of the bar or by the grass being clipped by such cutting edges. Following each rearward sliding movement of the cutter bar, the bar is immediately restored to outer position by the springs 44 so that the cutter bar is thus reciprocated or vibrated for the purpose to be later explained.

The cutter bar 33 is made hollow throughout the greater part of its length so as to provide a cavity or receptacle 50 adapted to contain a supply of loose, dry, abrasive particles 51, such as powdered carborundum. The abrasive particles may be poured into the receptacle 50 through a filler opening 52 which is normally closed by a removable can 53 (Fig. 3). Extending from the receptacle 50 to the cutting edge 32 of the cutter bar 33 is a plurality of passages 55 through which the abrasive particles 51 can pass.

When the cutter bar 33 is vibrated in a forward and rearward direction, the particles 51 are shaken from the receptacle and caused to pass outwardly through restricted passages 55 and onto the cutting edge 32. The abrasive particles 51 thus engage the coacting cutting edges of the bar and blades and act to abrade or grind these cooperating cutting surfaces to maintain them sharp. This grinding action is continuous so long as the mower is propelled forwardly so that the blades and bar are constantly sharpened during a grass mowing operation. It is necessary that the cutter bar 33 be periodically adjusted forwardly to a slightly greater extent so as to compensate for the grinding away of the cutting edges and this readjustment can be readily obtained by merely loosening the screws 38 and sliding the holder 35 forwardly to the proper degree, after which the screws are tightened to retain the parts in their newly adjusted position.

While I have herein shown and described the improved lawn mower as embodied in a preferred form of construction, by way of example, it will be apparent that various changes might be made in the structure without departing from the spirit of the invention. Consequently, I do not wish

I claim as my invention:

1. A rotary cutter reel for a lawn mower having a stationary cutter bar, comprising: a shaft; radial arms secured on said shaft at opposite ends thereof and having their respective outermost ends oppositely oriented with respect to the axis of said shaft; and at least two helical cutter blades carried by said arms, said blades being of a length substantially equal to the length of the stationary cutter bar with which the reel is to be used, the helices of said cutter blades being of alternately opposite hand, all the ends of said blades at each end of the reel being spaced circumferentially of the reel, the opposite ends of said blades being disposed, respectively, above and below the longitudinal axis of said shaft.

2. A rotary cutter reel for a lawn mower having a stationary cutter bar, comprising: a shaft; spaced pairs of radial arms on opposite ends of said shaft, the ends of one pair being disposed above and the ends of the other pair being disposed below the axis of said shaft; and a single pair of helical cutter blades carried by said arms, said blades being of a length substantially equal to the length of the stationary cutter bar with which the reel is to be used, the helices of said cutter blades being of opposite hand, the ends of said blades at each end of the reel being disposed adjacent each other but spaced circumferentially of the reel, said blades having their paired ends disposed above the axis of said shaft at one end of said reel and below said axis at the other end thereof.

NILS MADSEN.

REFERENCES CITED

The following references are of record in the file of this patent:

UNITED STATES PATENTS

| Number | Name | Date |
|---|---|---|
| 884,651 | Frey | Apr. 14, 1908 |
| 930,428 | Stapleton | Aug. 10, 1909 |
| 966,800 | Culver | Aug. 9, 1910 |
| 980,072 | Cramer | Dec. 27, 1910 |
| 2,238,707 | Ronning | Apr. 15, 1941 |
| 2,425,106 | Madsen | Aug. 5, 1947 |
| 2,496,973 | Worthington | Feb. 7, 1950 |